United States Patent
Park (10) Patent No.: US 8,468,321 B2
(45) Date of Patent: Jun. 18, 2013

(54) METHOD RELOCATING CODE OBJECTS AND DISC DRIVE USING SAME

(75) Inventor: Jun-bum Park, Pohang-si (KR)

(73) Assignee: Seagate Technology International, Grand Cayman (KY)

( * ) Notice: Subject to any disclaimer, the term of this patent is extended or adjusted under 35 U.S.C. 154(b) by 363 days.

(21) Appl. No.: 12/754,769

(22) Filed: Apr. 6, 2010

(65) Prior Publication Data

US 2010/0257311 A1    Oct. 7, 2010

(30) Foreign Application Priority Data

Apr. 6, 2009  (KR) .................. 10-2009-0029492

(51) Int. Cl.
*G06F 12/12* (2006.01)
(52) U.S. Cl.
USPC .................. 711/170; 711/159; 711/E12.019
(58) Field of Classification Search
USPC ..................... 711/112, 170, E12.019, 159
See application file for complete search history.

(56) References Cited

U.S. PATENT DOCUMENTS

| | | | |
|---|---|---|---|
| 6,279,108 B1* | 8/2001 | Squires et al. | 712/244 |
| 7,398,381 B2 | 7/2008 | Rudelic | |
| 2002/0083160 A1* | 6/2002 | Middleton | 709/221 |
| 2004/0015664 A1* | 1/2004 | Ciesinger et al. | 711/154 |
| 2004/0168078 A1* | 8/2004 | Brodley et al. | 713/200 |
| 2006/0225060 A1* | 10/2006 | Goyan | 717/151 |
| 2007/0288692 A1* | 12/2007 | Bruce et al. | 711/113 |
| 2008/0016507 A1* | 1/2008 | Thomas et al. | 718/100 |
| 2008/0091935 A1* | 4/2008 | Song | 713/2 |
| 2009/0055581 A1 | 2/2009 | Kim | |
| 2010/0083261 A1* | 4/2010 | Jayamohan et al. | 718/102 |

FOREIGN PATENT DOCUMENTS

| | | |
|---|---|---|
| GB | 2338574 A | 12/1999 |
| KR | 1020000039273 A | 7/2000 |
| KR | 1020020078229 A | 10/2002 |
| WO | 0242912 A1 | 5/2002 |

OTHER PUBLICATIONS

Gehringer, Edward F., "Operating System Principles—Lecture 23", http://www4.ncsu.edu, Jan. 4, 1999, pp. 221-230.

* cited by examiner

*Primary Examiner* — Hal Schnee
(74) *Attorney, Agent, or Firm* — Cesari & Reed, LLP; Kirk A. Cesari; Christian W. Best (57) ABSTRACT

A data storage device and a software method using same are described. The method dynamically relocates and includes; upon receiving a requirement to load a new code object to a first storage medium, allocating a dynamic relocation region of the first storage medium, writing information related a task to be performed in relation to the dynamic relocation region to a second storage medium, selecting the new code object from a plurality of code objects stored in the second storage medium, and loading the selected new code object to the allocated dynamic relocation region, and generating information for performing a task associated with the loaded new code object.

13 Claims, 6 Drawing Sheets

METHOD RELOCATING CODE OBJECTS AND DISC DRIVE USING SAME

CROSS-REFERENCE TO RELATED APPLICATION

This application claims the benefit of Korean Patent Application No. 10-2009-0029492 filed on Apr. 6, 2009, the subject matter of which is hereby incorporated by reference.

BACKGROUND

The inventive concept relates to a data storage device and a software design method using same.

In general, a memory used in a system-on-chip (SOC) configured to drive a disc drive has a fixed size. The size of this memory is typically small because the memory is essentially an embedded system. The resulting data storage capacity places significant limitation on the amount of programming code and related data that may be stored to control the functionality of an incorporating disc drive.

Accordingly, there is a need to dynamically relocate code in a disc drive in order to enable the performance of various disc drive functions using a memory having a limited data storage capacity.

SUMMARY

Embodiments of the inventive concept provide a method of dynamically relocating code objects which may be loaded during system operation. Embodiments of the inventive concept also provide a disc drive using a method of dynamically relocating code objects which may be loaded during system operation.

According to an aspect of the inventive concept, there is provided a method of dynamically relocating code objects, wherein the method includes: allocating a dynamic relocation region of a first storage medium to which a new code object is to be loaded, when a requirement for loading the new code object to the first storage medium occurs; writing information about a task that has to be performed in the dynamic relocation region of the first storage medium to a second storage medium; selecting the new code object from a plurality of code objects stored in the second storage medium and loading the new code object to the dynamic relocation region allocated to the first storage medium; and generating information for performing a task corresponding to the loaded new code object.

In the allocating of the dynamic relocation region, the dynamic relocation region of the first storage medium to which the new code object is to be loaded is allocated based on a priority sequence of tasks loaded to the first storage medium, wherein a task having lower priority is earlier selected.

If the new code object to be written in the dynamic relocation region is a code object that has been executed before, information about a task stored in the second storage medium is used as information for performing a task corresponding to the new code object.

If the new code object to be written in the dynamic relocation region is not a code object that has been executed before, information for performing a task corresponding to the new code object is initialized.

The information for performing a task may include at least task control block information and stack information.

The first storage medium includes a random access memory, and the second storage medium includes a disc.

The information about a task that has been performed in the dynamic relocation region of the first storage medium is written in a maintenance cylinder region of the disc.

According to an aspect of the inventive concept, there is provided a disc drive including: a first storage medium to which a code object, which corresponds to a task to be performed in a system, is loaded; a second storage medium which stores a plurality of code objects; and a processor which replaces at least one code object selected from code objects loaded to the first storage medium with at least one code object selected from code objects stored in the second storage medium, according to a code object dynamic relocation command.

The processor may include a code object management unit which manages position information of code objects and task control block information and stack information for performing tasks corresponding to the code objects.

The processor allocates a storage region of the first storage medium to which a new code object is to be loaded, according to a code object dynamic relocation command, stores information about a task that has been performed in the allocated storage region in the second storage medium, and reads the new code object to be loaded from the second storage medium and overwrites the new code object in the storage region allocated to the first storage medium.

When the processor reads the new code object to be loaded from the second storage medium and overwrites the new code object in the storage region which is allocated to the first storage medium according to a code object dynamic relocation command, if the new code object to be loaded is a code object that has been executed before, information about a task that has been stored in the second storage medium is used as a task control block and stack information for performing a task corresponding to the new code object.

The processor allocates a dynamic relocation region to the first storage medium, wherein the dynamic relocation region is a region to which a new code object is to be loaded, based on a priority sequence of tasks loaded to the first storage medium, wherein a task having lower priority is earlier selected.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

The present inventive concept, advantages of the inventive concept, and objectives achieved by embodiments of the inventive concept may be fully understood by referring to the attached drawings exemplarily illustrating embodiments of the inventive concept. Hereinafter, embodiments of the inventive concept will be described in some additional detail with reference to the attached drawings.

Figure 1:
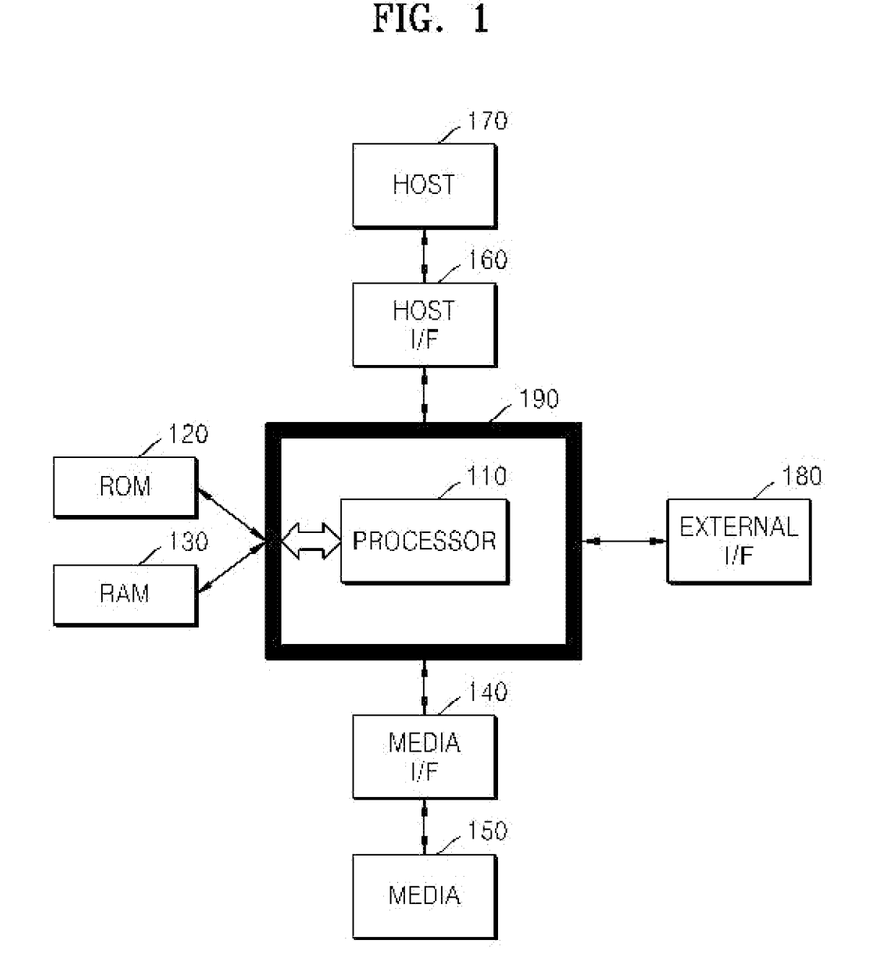
FIG. 1 is a block diagram of a disc drive according to an embodiment of the inventive concept.

Figure (FIG.) 1 is a block diagram of a disc drive according to an embodiment of the inventive concept. Referring to FIG. 1, the disc drive comprises a processor 110, a read only memory (ROM) 120, a random access memory (RAM) 130, a media interface (I/F) 140, a media 150, a host interface (I/F) 160, a host device (170), an external interface (I/F) 180, and a bus (190).

The processor 110 interprets a command and controls constituent elements of the disc drive according to the interpreted results. The processor 110 includes a code object management unit (not shown) that loads a code object stored in the media 150 to the RAM 130. In addition, the processor 110 controls in such a way that code objects loaded in the RAM 130 are dynamically relocated, as will be described in some additional detail hereafter.

The ROM 120 stores program codes and data for operating the disc drive.

The program codes and data stored in the ROM 120 or the media 150 are loaded to the RAM 130 according to a control of the processor 110. In the illustrated embodiment, code objects loaded to the RAM 130 are dynamically relocated according to a control of the processor 110.

In certain embodiments of the inventive concept, the media 150 includes a disc that is a major storage medium of the disc drive. For example, FIG. 6 is a perspective view of a head disc assembly including a disc in a disc drive according to an embodiment of the inventive concept.

Figure 6:
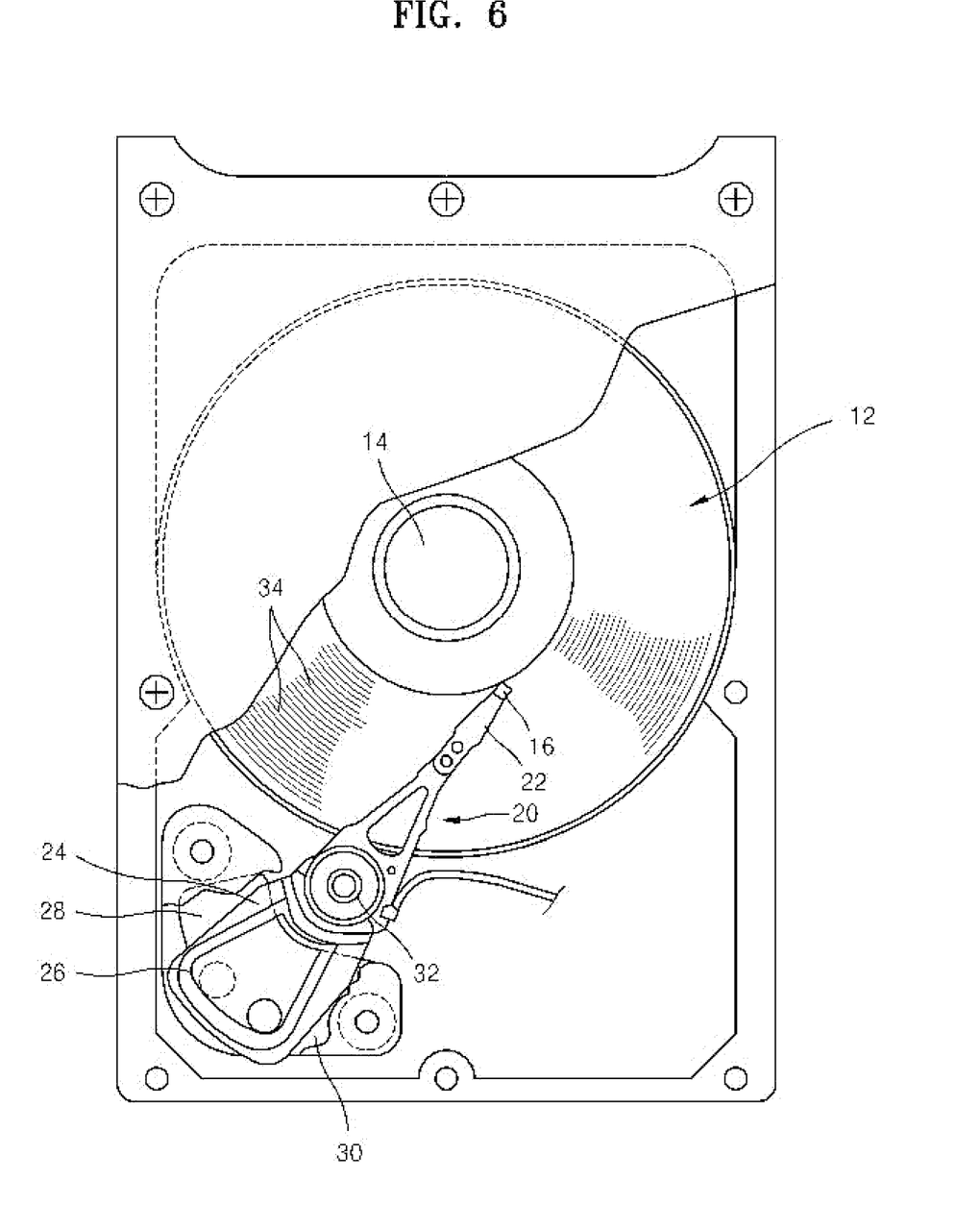
FIG. 6 is a perspective view of a head disc assembly included within a disc drive according to an embodiment of the inventive concept.

Referring to FIG. 6, the head disc assembly includes at least one disc 12 which is rotated by a spindle motor 14. The disc drive may also include a transducer 16 disposed close to the surface of the disc 12.

The transducer 16 reads information from the disc 12 or writes information to the disc by detecting a magnetic field of the disc 12 or magnetizing the disc 12. In general, the transducer 16 may be coupled with the surface of the disc 12. Although FIG. 6 illustrates only one transducer 16, the transducer 16 may consist of a write transducer for magnetizing the disc 12 and a read transducer for detecting a magnetic field from the disc 12. The read transducer may include a magneto-resistive (MR) device. In general, the transducer 16 is referred to as a head.

The transducer 16 may be incorporated into a slider 20. The slider 20 is structured such that an air bearing is formed between the transducer 16 and the surface of the disc 12. The slider 20 is combined with a head gimbals assembly 22. The head gimbals assembly 22 is attached to an actuator arm 24 including a voice coil 26. The voice coil 26 is disposed adjacent to a magnetic assembly 28 to define a voice coil motor (VCM) 30. The current provided to the voice coil 26 generates a torque for rotating the actuator arm 24 with respect to the bearing assembly 32. Due to the rotation of the actuator arm 24, the transducer 16 crosses over the surface of the disc 12.

The disc 12 includes a plurality of tracks 34 which are annular. In general, information is stored in the tracks 34 of the disc 12, wherein each of the tracks 34 generally includes a plurality of sectors that each includes a data field and an identification field. The identification field includes a gray code for identifying a sector and a track cylinder. A logic block address is allocated to a recordable region of the disc 12. The logic block address of the disc drive is converted into cylinder/head/sector information and stored in the recordable region of the disc 12. The disc 12 includes a maintenance cylinder region to which a user has no access and a user data region to which a user has access. The transducer 16 crosses over the surface of the disc 12 to read information of other tracks or write information thereon.

A plurality of code objects may be stored in the disc 12 to perform various functions using the disc drive. For example, a code object for performing an MP3 playing function, a code object for performing a navigation function, a code object for performing various video games may be stored in the disc 12.

Referring again to FIG. 1, the media interface 140 allows the processor 110 to access to the media 150, such that the processor 110 writes/reads data. The media interface 140 may include a servo circuit (not shown) for controlling the head disc assembly and a reading/writing channel circuit (not shown) for performing a signal process for data reading/writing.

The host interface 160 enables data read/write processing together with a host device such as a personal computer. For example, examples of the host interface 160 include a serial advanced technology attachment (SATA) interface, a parallel advanced technology attachment (PATA) interface, and a universal serial bus (USB) interface.

The external interface 180 enables data read/write processing together with an external device via input/output (I/O) terminals installed in the disc drive. Examples of the external interface 180 include an accelerated graphics port (AGP) interface, a USB interface, an IEEE1394 interface, a personal computer memory card international association (PCMCIA) interface, a LAN interface, a Bluetooth interface, a high definition multimedia interface (HDMI), a programmable communication interface (PCI), an industry standard architecture (ISA) interface, a peripheral component interconnect-express (PCI-E) interface, an express card interface, a SATA interface, a PATA interface, and a serial interface.

The bus 190 delivers data between constituent components of the disc drive.

Operation of dynamically relocating code objects in the disc drive by the processor 110 will now be described in some additional detail with reference to FIG. 2 which conceptually illustrates a software operating system.

Figure 2:
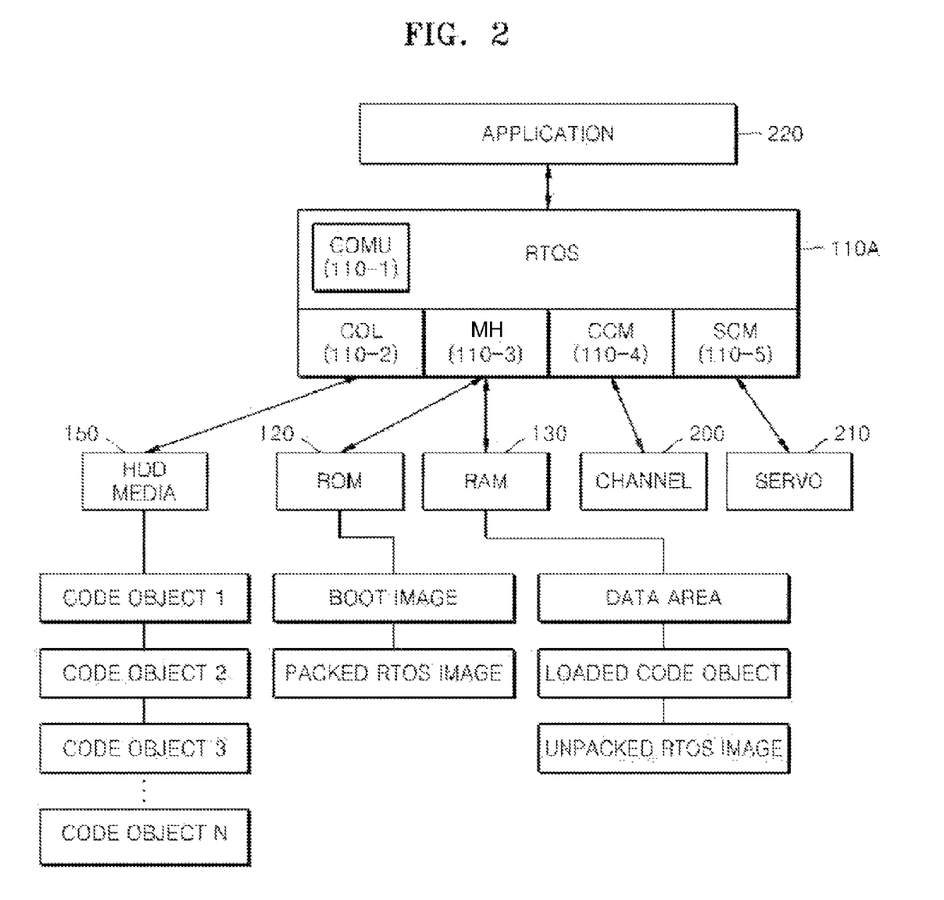
FIG. 2 is a diagram conceptually illustrating a software operating system for a disc drive according to an embodiment of the inventive concept.

Referring to FIG. 2, the media 150, for example, hard disc drive (HDD) media stores a plurality of code objects 1 through N.

The ROM 120 stores a boot image and a packed real time operating system (RTOS) image.

In the illustrated embodiment of FIG. 2, the HDD media 150 is assumed to be a magnetic disc. The plurality of code objects stored on the disc may include a code objects for operating a disc drive and code objects related to various functions to be performed in the disc drive. For example, code objects for performing an MP3 player function, a navigation function, or a video game function may be stored in the disc.

An unpacked RTOS image obtained by reading a boot image from the ROM 120 is loaded to the RAM 130. In addition, code objects, which are stored in the HDD media 150 and required to perform a host interface and an external interface, are loaded to the RAM 130. The RAM 130 may include a data storage region DATA AREA.

A channel circuit 200 includes a circuit for performing a signal process for data reading/writing, and a servo circuit 210 includes circuits for controlling the head disc assembly to perform data reading/writing.

An RTOS 110A is a multi-program operating system using a disc. According to various assigned tasks (and related commands), the RTOS 110A performs real-time multiprocessing in a foreground having higher priority, and batch processing in a background having lower priority. In addition, the RTOS 110A loads code objects from the disc and unloads code objects to the disc.

The RTOS 110A manages a code object management unit (COMU) 110-1, a code object loader (COL) 110-2, a memory handler (MH) 110-3, a channel control module (CCM) 110-4, and a servo control module (SCM) 110-5, and performs tasks corresponding to required commands. The RTOS 110A also manages an application program 220.

The COMU 110-1 stores position information indicating where code objects are stored, converts a virtual address into an actual address, and performs bus arbitration. The COMU 110-1 also stores priority information related to tasks to be performed. In addition, the COMU 110-1 manages task control block (TCB) information and stack information for performing tasks corresponding to code objects.

The COL 110-2 loads code objects stored in the HDD media 150 to the RAM 130, or unloads code objects stored in the RAM 130 onto the HDD media 150, by using the COMU 110-1.

The HM 110-3 writes data to or reads data from the ROM 120 or the RAM 130.

The CCM 110-4 performs a channel control for performing signal processing during read/write processing, and the SCM 110-5 performs a servo control including the head disc assembly to perform read/write processing.

Initially, while the disc drive is being booted up, the RTOS 110A loads code objects for controlling a disc drive to the RAM 130. Then, after boot-up of the disc drive, it may be driven by using the code objects loaded to the RAM 130.

If code objects need to be dynamically relocated in order to perform additional functions, excluding functions that are performed using the code objects which have been loaded to the RAM 130, when the disc drive operates, the RTOS 110A relocates the code objects that have been loaded to the RAM 130 by using the COMU 110-1 in the following manner.

First, when dynamic relocation of code objects is required, the RTOS 110A selects tasks corresponding to code objects which have been loaded to the RAM 130 in such a sequence that a task having lower priority is earlier selected, by using the COMU 110-1. Then, the RTOS 110A writes TCB information and stack information of the selected task to the disc, by using the COL 110-2. In the illustrated embodiment of FIG. 2, the disc may be the HDD media 150. The TCB information and stack information of the selected task may be stored in a maintenance cylinder region of the disc.

The RTOS 110A obtains position information regarding where a code object is to be newly stored using the COMU 110-1, and then overwrites the new code object selected from code objects stored in the disc in a region of the RAM 130 where the task having lowest priority has been present using the COL 110-2.

Then, the RTOS 110A determines, using the COMU 110-1, whether the new code object has ever been executed before. If the new code object has been executed before, the RTOS 110A reads TCB information and stack information related to the corresponding code object from the disc and determines the read TCB information and stack information as TCB information and stack information for performing a task corresponding to the new code object that has been loaded to the RAM 130. Otherwise, if the newly loaded code object has not been executed before, TCB and stack information, which is task information about the newly loaded code object, is initialized.

By performing these operations described above, a code object for performing a new function may be loaded to the RAM 130 without re-starting the system.

Figure 3:
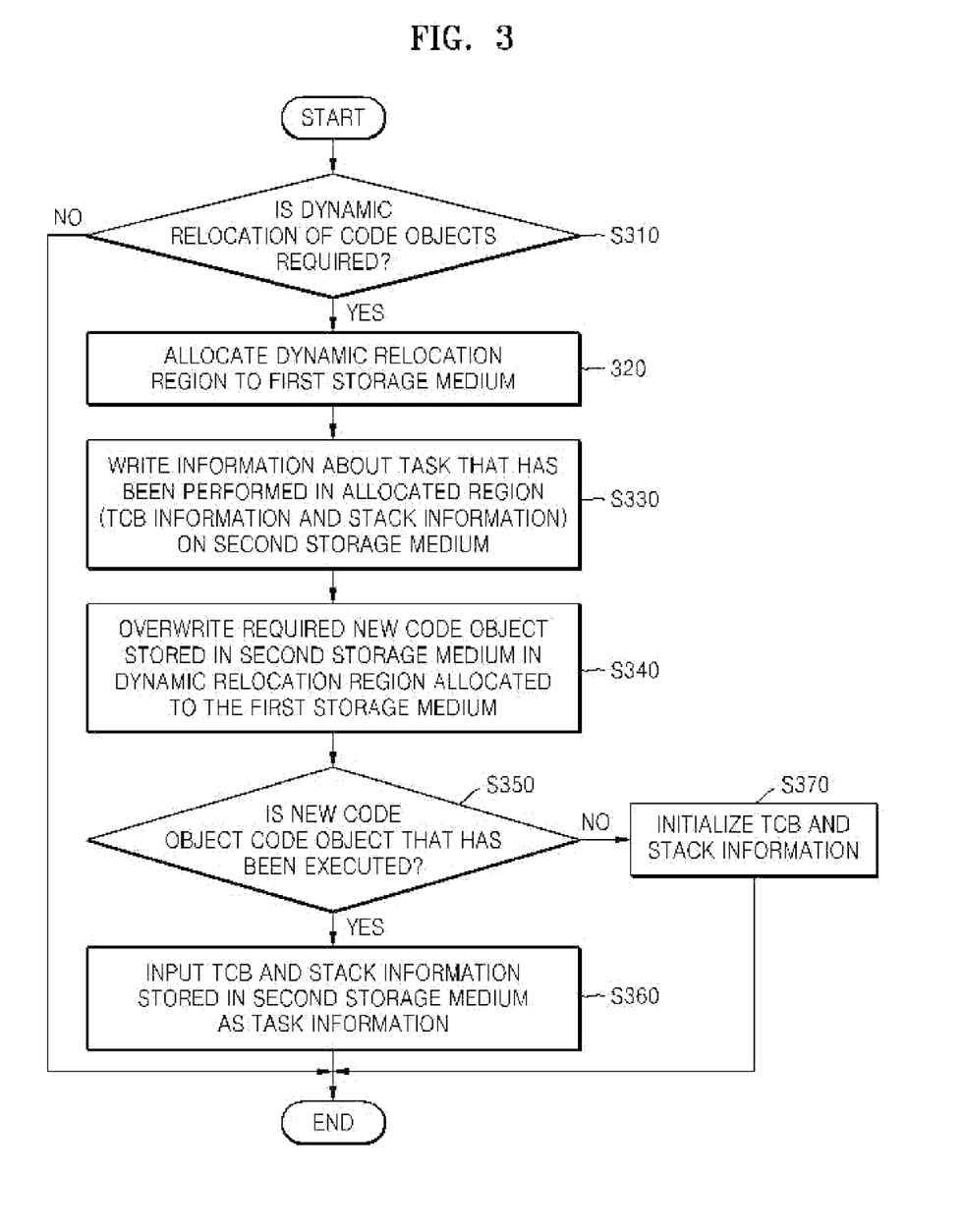
FIG. 3 is a flowchart summarizing a method of dynamically relocating code objects according to an embodiment of the inventive concept.

Now, a method of dynamically relocating code objects, according to an embodiment of the inventive concept will be described with reference to FIGS. 1 and 3.

First, the processor 110 determines whether dynamic relocation of code objects is required (S310). The dynamic relocation of code objects is required in the case in which, after booting up, code objects, which have been loaded to the RAM 130, need to be replaced with new code objects. The code object dynamic relocation requirement may be received from the host device 170, and also, from a device connected to the external interface 180.

If dynamic relocation of code objects is required, the processor 110 allocates a dynamic relocation region to a first storage medium, by using the code object management unit (COMU) included in the processor 110 (S320). In certain embodiments of the inventive concept, the first storage medium may be the RAM 130. An exemplary method of allocating the dynamic relocation region will be described in some additional detail. Code objects, which have been loaded to the RAM 130, are selected in a priority sequence, that is, a task having lower priority is earlier selected. Then, a region in which the selected task is performed is allocated as the dynamic relocation region.

TCB information and stack information, which are information about the region allocated as the dynamic relocation region in operation 5310, are written in a second storage medium (S330). In the illustrated present embodiment, the second storage medium may be a disc; that is, the HDD media 150. For example, the TCB information and stack information, which are information about the region allocated as the dynamic relocation region, may be stored in a maintenance cylinder region of the disc.

Then, a new code object which is required among code objects stored in the second storage medium may be read and overwritten in the dynamic relocation region allocated in the first storage medium (S340).

Then, it is identified whether the new code object, which is loaded to the dynamic relocation region of the first storage medium, has been executed before (S350). This identification operation may be performed using a code object history stored in a COMU.

If it is identified in operation S350 that the new code object is a code object that has been loaded before, TCB information and stack information related to the corresponding code object are read from the second storage medium and set as TCB information and stack information for performing a task corresponding to the new code object that is loaded to the RAM 130 (S360).

Otherwise, if it is identified that the new code object is not a code object that has been loaded before, TCB information and stack information for performing a task corresponding to the new code object are initialized (S370).

As described above, dynamic relocation of code objects is performed when a hard disc drive boots up and is being executed.

Figure 4:
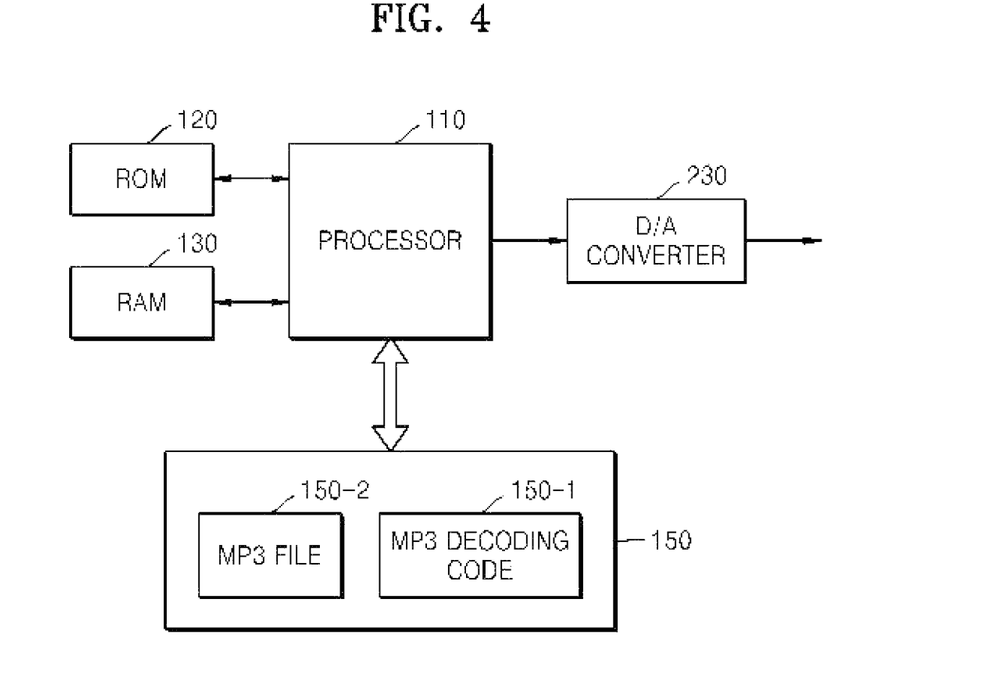
FIG. 4 is a general block diagram illustrating an example of operating a disc drive within an MP3 player using the method of dynamically relocating code objects according to an embodiment of the inventive concept.

An example of operating a disc drive as an MP3 by applying the method of dynamically relocating code objects to a disc drive will be described in some additional detail with reference to FIG. 4. FIG. 4 is a block diagram illustrating one application embodiment for operating the disc drive as the MP3 player using a method of dynamically relocating code objects to the disc drive according to an embodiment of the inventive concept.

As illustrated in FIG. 4, the disc drive comprises a processor 110, a ROM 120, a RAM 130, a HDD media 150, and a digital/analog converter 230.

The HDD media 150 includes, in addition to code objects for operating the disc drive itself, an MP3 decoding code 150-1, and an MP3 file 150-2.

When an MP3 player function is needed to be performed in the disc drive during when the disc drive boots up and code objects for operating the disc drive are loaded and executed, the processor 110 loads the MP3 decoding code 150-1 stored in the HDD media 150 to the RAM 130 by using the method of dynamically relocating code objects as described above.

Then, according to an input command, the processor 110 reads the MP3 file 150-2 from the HDD media 150 and loads the MP3 file 150-2 to the RAM 130. The MP3 file 150-2 loaded to the RAM 130 is decoded by using the MP3 decoding code 150-1 that has been loaded to the RAM 130 and then outputs to the digital/analog converter 230.

The digital/analog converter 230 converts a digital signal processed by MP3 decoding into an analog signal and outputs the analog signal to a speaker (not shown). As such, the disc drive performs an MP3 player function.

Figure 5:
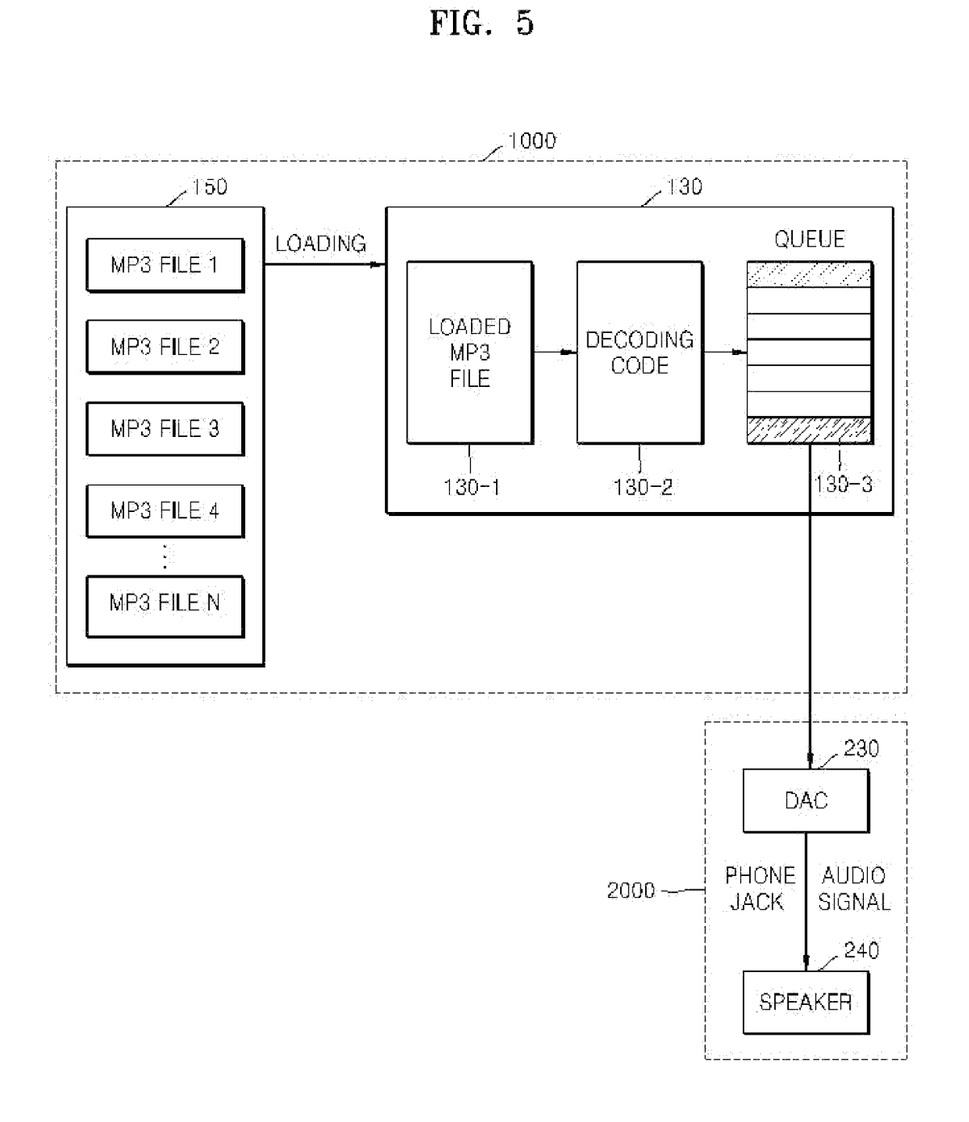
FIG. 5 is a conceptual diagram illustrating exemplary data processing for the MP3 player of FIG. 4.

FIG. 5 further conceptually illustrates the data processing of FIG. 4.

The HDD media 150, the RAM 130, and a Queue buffer 130-3 may be included in a disc drive 1000, and the digital/analog converter 230 and a speaker 240 may be included in an external device 2000 which is connected to an external interface of the disc drive 1000. In certain embodiments of the inventive concept, all of the constituent elements of the external device 2000 may be included in the disc drive 1000. In other embodiments, only the digital/analog converter 230 may be included in the disc drive 1000.

In a case in which an MP3 decoding code 130-2 is loaded to the RAM 130 using the method of dynamically relocating code objects, when a command for MP3 playing is input through an input interface, the processor 110 reads an MP3 file from the HDD media 150 and loads the MP3 file to the RAM 130.

Then, according to a control of the processor 110, an MP3 file 130-1 is decoded by using the MP3 decoding code 130-2 in the RAM 130 and outputs the decoded MP3 file to the Queue buffer 130-3. Then, data which is stored in the Queue buffer 130-3 is output to the digital/analog converter 230 through the external interface in a given sequence, and an analog signal processed by the digital/analog converter 230 is output to the external device 240.

Thus, without adding a separate MP3 decoding circuit to the disc drive 1000, only with software design, the disc drive 1000 can be operated as an MP3 player.

Referring back to FIG. 1, various functions may be performed by the disc drive by storing code objects for performing additional functions, in addition to code objects for driving the disc drive, in the media 150, and dynamically relocating code objects that have been loaded to the RAM 130 after booting up.

When code objects for performing other functions, such as a MP player function, a navigation function, or a video game function, in addition to the unique function of the disc drive, are stored in the media 150 and the method of dynamically relocating code objects is applied to the disc drive, various functions excluding the unique function of the disc drive can be performed by using the disc drive.

That is, by using the method of dynamically relocating code objects, the disc drive can be operated as an MP3 player, a navigation device, or a video game device. Specifically, to operate the disc drive as an MP3 player, the external interface 180 needs to be connected to the digital/analog converter and the external device 240 illustrated in FIG. 5. In addition, to operate the disc drive as a navigation device, a display device needs to be connected to the external interface 180.

Thus, when dynamic relocation of code objects is performed in the disc drive according to a device connected to the external interface 180, the disc drive can be operated as various devices according to software design.

The dynamic relocation of code objects may also be performed corresponding to a device connected through the host interface 160, not the external interface 180.

By reference, the disc drive can be operated as a communications storage by, for example, adding a TCP/IP acceleration engine and a module for supporting Ethernet media access control (MAC) to the processor 110 and then dynamically relocating software related thereto.

While the inventive concept has been particularly shown and described with reference to exemplary embodiments thereof, it will be understood that various changes in form and details may be made therein without departing from the scope of the following claims.

What is claimed is:

1. A method comprising:
   receiving a requirement to load a new code object to a first storage medium;
   allocating an area of the first storage medium containing an old code object as a dynamic relocation region when there is insufficient space to load the new code object to the first storage medium;
   storing the old code object to a second storage medium;
   writing the new code object to the allocated dynamic relocation region;
   prior to executing a task associated with the loaded new code object:
      loading task control block information and stack information from the second storage medium when the new code object has been previously executed; and
      generating task control block information and stack information when the new code object has not been previously executed.

2. The method of claim 1, wherein allocating of the dynamic relocation region comprises allocating the dynamic relocation region based on a priority sequence of tasks loaded to the first storage medium, wherein a task having lower priority is earlier selected as the old code object.

3. The method of claim 1, wherein the first storage medium comprises a random access memory and the second storage medium comprises a disc.

4. The method of claim 3, further comprising writing task control block information and stack information related to a task associated with the old code object that has previously been performed in a maintenance cylinder region of the disc.

5. The method of claim 1, further comprising storing task control block information and stack information related to a task associated with the old code object that has previously been performed in the second storage medium.

6. The method of claim 1 wherein the second storage medium is a separate nonvolatile memory from the first storage medium.

7. A device comprising:
   a first storage medium;
   a second storage medium;
   a processor configured to:
      receive a command to load a new code object to the first storage medium;
      allocate an area of the first storage medium containing an old code object as a dynamic relocation region when there is insufficient space to load the new code object to the first storage medium;

store the old code object to the second storage medium;

write the new code object to the allocated dynamic relocation region; and prior to executing a task associated with the loaded new code object:

load task control block information and stack information from the second storage medium when the new code object has been previously executed; and generate task control block information and stack information when the new code object has not been previously executed.

8. The device of claim 7, wherein the processor comprises:

a code object management unit configured to manage position information for code objects, task control block information, and stack information associated with performing tasks related to the code objects.

9. The device of claim 7, wherein the processor is further configured to store information related to a task associated with the old code object that has previously been performed in the second storage medium.

10. The device of claim 7, wherein the processor is further configured to allocate the dynamic relocation region based on a priority sequence of tasks associated with code objects loaded to the first storage medium, wherein a code object associated with a task having lower priority is earlier selected as the old code object.

11. The device of claim 7, wherein the first storage medium comprises a random access memory and the second storage medium comprises a disc.

12. The device of claim 7 wherein the second storage medium is a separate nonvolatile memory from the first storage medium.

13. The device of claim 7 further comprising a system-on-chip which includes the first storage medium.

* * * * *